US012442219B2

(12) United States Patent
Liu et al.

(10) Patent No.: US 12,442,219 B2
(45) Date of Patent: Oct. 14, 2025

(54) ELECTRIC LOCK AND CONTROL METHOD THEREOF

(71) Applicant: SCHNEIDER ELECTRIC IT CORPORATION, Foxboro, MA (US)

(72) Inventors: Bo Liu, Shanghai (CN); Le Wang, Shanghai (CN); MingJi Chen, Shanghai (CN); JinNan Shen, Shanghai (CN); Xinfu Liu, Shanghai (CN); Huafeng Song, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 425 days.

(21) Appl. No.: 17/808,911

(22) Filed: Jun. 24, 2022

(65) Prior Publication Data

US 2023/0417079 A1 Dec. 28, 2023

(51) Int. Cl.
*H01H 9/00* (2006.01)
*E05B 47/00* (2006.01)

(52) U.S. Cl.
CPC ........... *E05B 47/0004* (2013.01); *H01H 9/00* (2013.01); *E05B 2047/0016* (2013.01); *E05B 2047/0073* (2013.01)

(58) Field of Classification Search
CPC ......... E05B 47/0004; E05B 2047/0016; E05B 2047/0073; H01H 9/00
See application file for complete search history.

(56) References Cited

U.S. PATENT DOCUMENTS 4,439,808 A * 3/1984 Gillham ................ E05C 19/168 292/144
5,359,322 A * 10/1994 Murray ............. G07C 9/00571 340/5.5
5,588,317 A * 12/1996 Bianco ...................... G07F 5/18 340/5.5
6,053,762 A * 4/2000 Matsumura ........ H01R 13/6335 439/484
6,271,751 B1 * 8/2001 Hunt ..................... E05C 19/166 340/542
6,666,055 B2 * 12/2003 Janicek ................... G06F 1/184 361/759
6,880,868 B2 * 4/2005 Brami ................... E05C 19/168 292/DIG. 55
11,566,446 B2 * 1/2023 Pukari ................. E05B 17/2092
2011/0163556 A1 * 7/2011 Scheffler ............. E05B 47/0002 292/337
2022/0102097 A1 * 3/2022 Kinsel .................. H01H 71/142

* cited by examiner

*Primary Examiner* — Thomas D Alunkal
(74) *Attorney, Agent, or Firm* — Lando & Anastasi, LLP

(57) ABSTRACT

A lock includes a latch and electromagnet configured to open the latch in response to a voltage being applied across the electromagnet. The lock includes a normally closed switch configured to open in response to the voltage being applied across the electromagnet. The lock includes a normally open switch configured to close in response to the voltage being applied across the electromagnet. A method of opening a lock includes applying a voltage across an electromagnet in a lock. The electromagnet is configured to open a latch in the lock in response to the voltage being applied across the electromagnet. The method includes causing the electromagnet to open the latch in response to the voltage being applied across the electromagnet. The method includes opening a normally closed switch by applying the voltage across the electromagnet and closing a normally open switch by applying the voltage across the electromagnet.

21 Claims, 7 Drawing Sheets

ELECTRIC LOCK AND CONTROL METHOD THEREOF

TECHNICAL FIELD

The present disclosure provides an electric lock that may be unlocked. In particular, in some embodiments, the lock may be unlocked by electrical means.

BACKGROUND

An electric lock may be unlocked by applying an electrical signal to an input on the lock. In some circumstances, it may be desirable to unlock multiple locks within a short period of time. For example, it may be desirable to unlock multiple locks within one second or two seconds or five seconds. It may be desirable to unlock multiple locks within a short period of time in, for example, an Information Technology (IT) room. In an IT room, multiple rack cabinets may have doors and locks that are locked to prevent unauthorized access to IT equipment within the cabinets. An IT room may be a room holding IT equipment, such as servers and power equipment. An example of power equipment may be an Uninterruptible Power Supply. If users want to access IT equipment in multiple cabinets, they may seek to unlock the locks and open the doors to multiple cabinets within a short period of time, such as within about 40 milliseconds, about one second, or about five seconds. If there is a high temperature in one or more cabinets, it may be desirable to unlock the locks and open the doors to the multiple cabinets within a short period of time, such as within one second. To unlock the locks, an electrical signal may be applied from an electrical source to inputs on the locks. Thus, the locks may draw a current from the source.

SUMMARY

Consistent with disclosed embodiments, there is provided a lock comprising a latch, an electromagnet configured to open the latch in response to a first voltage being applied across the electromagnet, a normally closed switch configured to open in response to the first voltage being applied across the electromagnet, and a normally open switch configured to close in response to the first voltage being applied across the electromagnet. The lock may include an input. The lock may be configured to receive the first voltage from an upstream lock via the input in response to the first voltage being applied across an electromagnet in the upstream lock. The lock may include an output. The lock may be configured to output a second voltage to a downstream lock via the output in response to the first voltage being applied across the electromagnet. The lock may be configured to apply the second voltage to the output in response to the normally open switch closing. The first voltage may be within about 20% of the second voltage. The lock may include a microswitch comprising the normally closed switch and the normally open switch. The lock may be configured to disconnect the first voltage from the electromagnet in response to the normally closed switch opening. The lock may be configured to open the latch in response to the first voltage is applied across the electromagnet by applying a force onto a first hook configured to open the latch. The lock may be configured to engage at least one switch in response to the first voltage being applied across the electromagnet. The first hook may be configured to permit rotation of a second hook under tension from a spring in response to the first voltage being applied across the electromagnet, wherein the second hook comprises the latch.

Consistent with disclosed embodiments, there is provided a method of opening a lock including applying a first voltage across an electromagnet in a lock. The electromagnet may be configured to open a latch in the lock in response to the first voltage being applied across the electromagnet. The method includes causing the electromagnet to open the latch in response to the first voltage being applied across the electromagnet, opening a normally closed switch by applying the first voltage across the electromagnet, and closing a normally open switch by applying the first voltage across the electromagnet. The lock may include an input and the first voltage may be an input voltage applied to the input. Applying the first voltage across the electromagnet may include applying the first voltage across the electromagnet via the input by applying the first voltage across an electromagnet in an upstream lock. The method may include applying a second voltage to a downstream lock via a lock output by applying the first voltage across the electromagnet. Applying the second voltage to the downstream lock via the lock output may include closing the normally open switch. The first voltage may be within about 20% of the second voltage. The method may include disconnecting the first voltage from the electromagnet by opening the normally closed switch. The normally closed switch may be in the lock and the normally open switch may be in the lock.

Consistent with disclosed embodiments, there is provided a method of assembling a lock including coupling a latch to an electromagnet configured to open the latch in response to a first voltage being applied across the electromagnet, coupling to the electromagnet a normally closed switch configured to open in response to the first voltage being applied across the electromagnet; and coupling to the electromagnet a normally open switch configured to close in response to the first voltage being applied across the electromagnet. The method may include coupling the electromagnet to a microswitch comprising the normally closed and the normally open switch. The method may include coupling a hook to a spring.

The foregoing general description and the following detailed description are exemplary and explanatory only and are not restrictive of the claims.

Other objects and features will be in part apparent and in part pointed out hereinafter.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
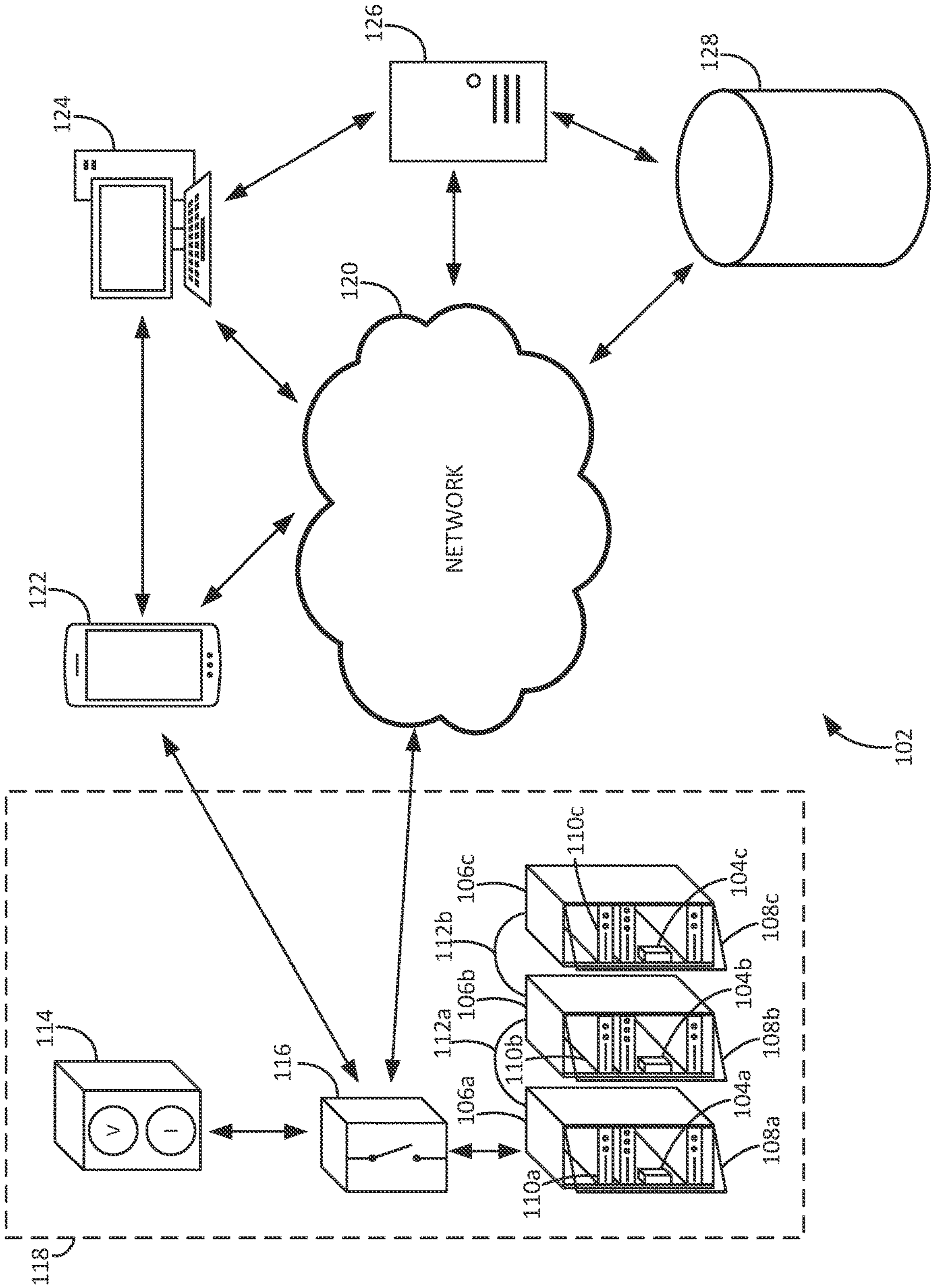
FIG. 1 is a diagram of an exemplary system environment within which an exemplary lock may be unlocked.

In view of the shortcomings of current systems and methods, improved systems and methods for providing the same are desired.

As described in further detail herein, exemplary embodiments disclosed herein are directed to an electric lock and control method thereof. In this context, a control method for a lock may include a method of unlocking one or more lock and/or locking one or more lock. An electrical signal may be applied from one or more electrical sources to inputs on multiple locks to unlock them. Thus, the locks may draw a current from a source. When users want to unlock more than one lock simultaneously, the current required to unlock the locks may be relatively large. This may require reliance on a large power source or multiple power sources to supply the large current. Using a large power source or multiple power sources may be expensive and impractical due to the space required to accommodate a large power source or multiple power sources.

One possible method of decreasing the current required to unlock multiple locks is to delay the unlocking of each subsequent lock in a sequence of locks using a processor or other controller. This delay could be relatively short, such as about 20 milliseconds, such that users perceive the locks to be unlocked simultaneously or nearly simultaneously. For example, in a sequence of three locks, a controller may cause a current to flow to a second lock about 20 milliseconds after it causes a current to flow to a first lock. The controller may then cause a current to flow to a third lock about 20 milliseconds after it causes the current to flow to the second lock. In this manner, the currents required to open the three locks are supplied sequentially instead of simultaneously, which facilitates a lower total current requirement. The processor or controller and corresponding circuitry required to facilitate this sequential opening, however, may be expensive and take up valuable space on a circuit board. Designing the hardware and software necessary for the operation of the processor or controller in this manner may also add cost, complexity, and size to systems relying on multiple locks.

Reference will now be made in detail to exemplary embodiments, examples of which are illustrated in the accompanying drawings and disclosed herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. In addition, in the event of inconsistent usages of terms between this document and documents incorporated herein by reference, the term usage in the incorporated references is supplementary to that of this document; for irreconcilable inconsistencies, the term usage in this document controls.

FIG. 1 is a diagram of an exemplary system environment 102 within which an exemplary lock 104*a*, exemplary lock 104*b*, and exemplary lock 104*c* may be unlocked. Lock 104*a*, lock 104*b*, and lock 104*c* may be respectively within a cabinet 106*a*, a cabinet 106*b*, and a cabinet 106*c*. Cabinet 106*a*, cabinet 106*b*, and cabinet 106*c* may respectively include a door 108*a*, a door 108*b*, and a door 108*c*. Lock 104*a*, lock 104*b*, and lock 104*c* may respectively lock door 108*a*, door 108*b*, and door 108*c*. Cabinet 106*a*, cabinet 106*b*, and cabinet 106*c* may respectively contain IT equipment such as a server 110*a*, a server 110*b*, and a server 110*c*. One or more elements within cabinet 106*a* may be electrically coupled to one or more elements within cabinet 106*b* via one or more cables 112*a*. For example, lock 104*a* may be electrically coupled to lock 104*b*. One or more elements within cabinet 106*b* may be electrically coupled to one or more elements within cabinet 106*c* via one or more cables 112*b*. For example, lock 104*b* may be electrically coupled to lock 104*c*. In some embodiments, one or more elements within cabinet 106*a* may be electrically coupled to one or more elements within cabinet 106*c* via one or more cables (not shown). For example, lock 104*a* may be electrically coupled to lock 104*c*.

System environment 102 may include a power supply 114. Power supply 114 may output power to a controller 116. Controller 116 may transmit power to lock 104*a*. In some embodiments, power supply 114 and controller 116 may be a single component or piece of equipment. Lock 104*a* may be configured to transmit power from power supply 114 to lock 104*b*, and lock 104*b* may be configured to transmit power from power supply 114 to lock 104*c*. In this manner, lock 104*a* is upstream from lock 104*b*, and lock 104*b* is upstream from lock 104*c*.

Power supply 114, controller 116, cabinet 106*a*, cabinet 106*b*, and cabinet 106*c* may be part of an IT environment 118. In some embodiments, IT environment 118 may have two cabinets, such as cabinet 106*a* and cabinet 106*b*. In some embodiments, IT environment may have three or more cabinets. One or more of the cabinets may have locks such as lock 104*a*. The locks may be electrically connected to locks in other cabinets in IT environment 118.

System environment 102 may include a network 120. Network 120 may include one or more of a mobile device 122, a computer terminal 124, a server 126, or a database 128. In some embodiments, mobile device 122, computer terminal 124, server 126, or database 128 may be part of IT environment 118. It is to be understood that system environment 102 and IT environment 118 may include elements instead or in addition to those listed and may lack one or more of the elements listed.

Elements of system environment 102 may communicate with elements of IT environment 118 over network 120 or directly. For example, mobile device 122, computer terminal 124, server 126, or database 128 may communicate with controller 116 or other elements of IT environment 118 over network 120 or directly. This communication may comprise, for example, an instruction to unlock at least one of lock 104*a*, lock 104*b*, or lock 104*c*. Such instruction may be initiated by a user seeking to unlock lock 104*a*, lock 104*b*, and lock 104*c*. The instruction to unlock may come from an element of IT environment 118, such as a processor (not shown) receiving an indication of a high-temperature or low-humidity environment within cabinet 106*a*, cabinet 106*b*, or cabinet 106*c*. Such indication may be a signal from a sensor within cabinet 106*a*, cabinet 106*b*, or cabinet 106*c* (not shown). Upon receiving such an instruction, controller 116 may transmit power to lock 104*a*. Sending the instruction may be initiated by a user with a selection in a user interface of an element in system environment 102. For example, a touchscreen may have a button for opening door 108*a*, door 108*b*, and door 108*c*.

System elements in FIG. 1 may be arranged as desired. Network 120 may be a wired and/or wireless network that uses, for example, physical and/or wireless data links to carry network data among (or between) network components. Network 120 may support voice, push-to-talk (PTT), broadcast video, and/or network data communications by network components. Wireless network protocols can include, for example, MBMS, CDMA, 1×RTT, GSM, UMTS, HSPA, EV-DO, EV-DO rev. A, 3GPP LTE, WiMAX, etc. Wired network protocols can include, for example, Ethernet, Fast Ethernet, Gigabit Ethernet, Local Talk (such as Carrier Sense Multiple Access with collision Avoidance), Token Ring, FDDI, ATM, etc.

Figure 2:
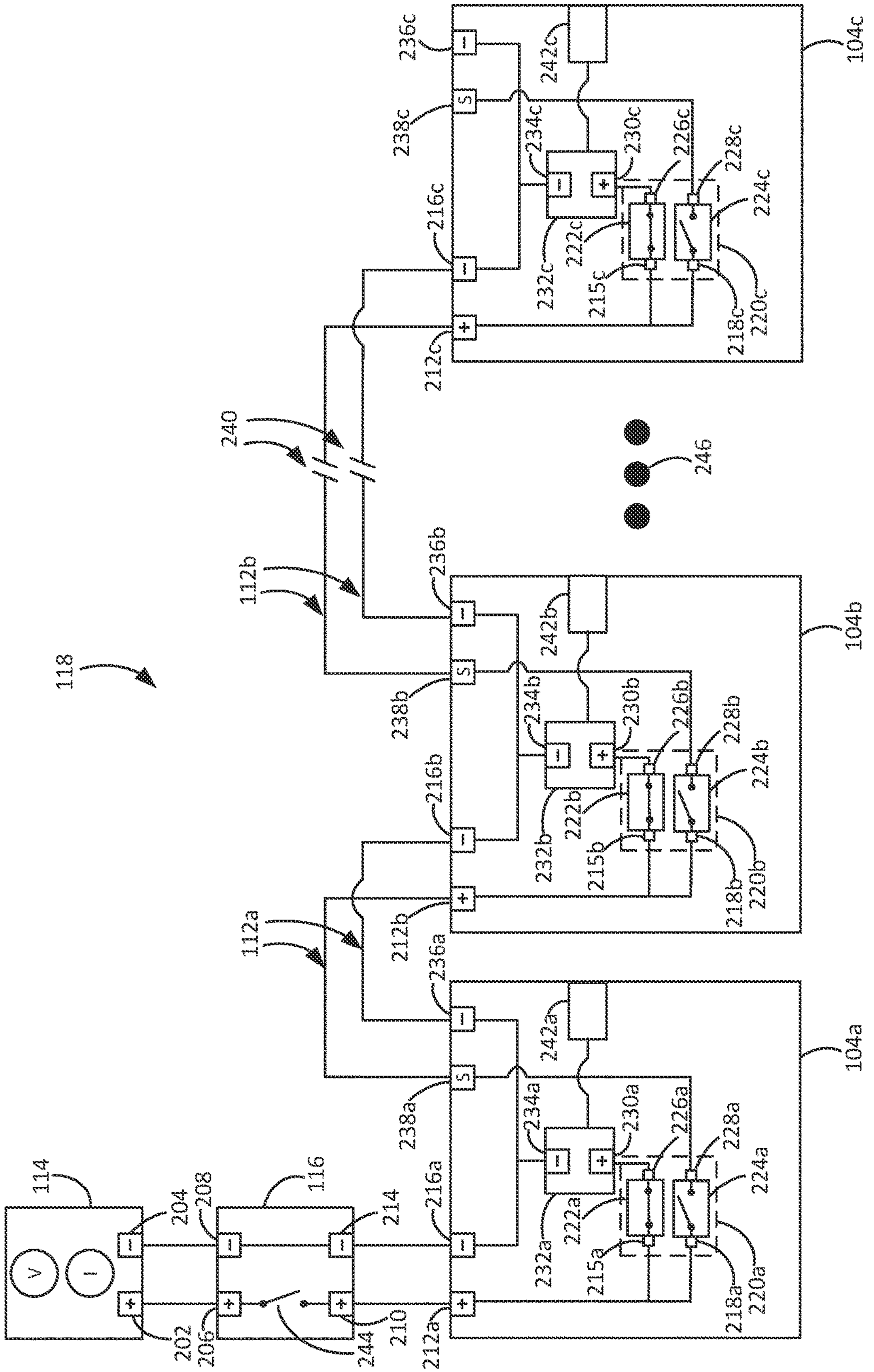
FIG. 2 is a diagram of an exemplary IT environment.
Figure 3:
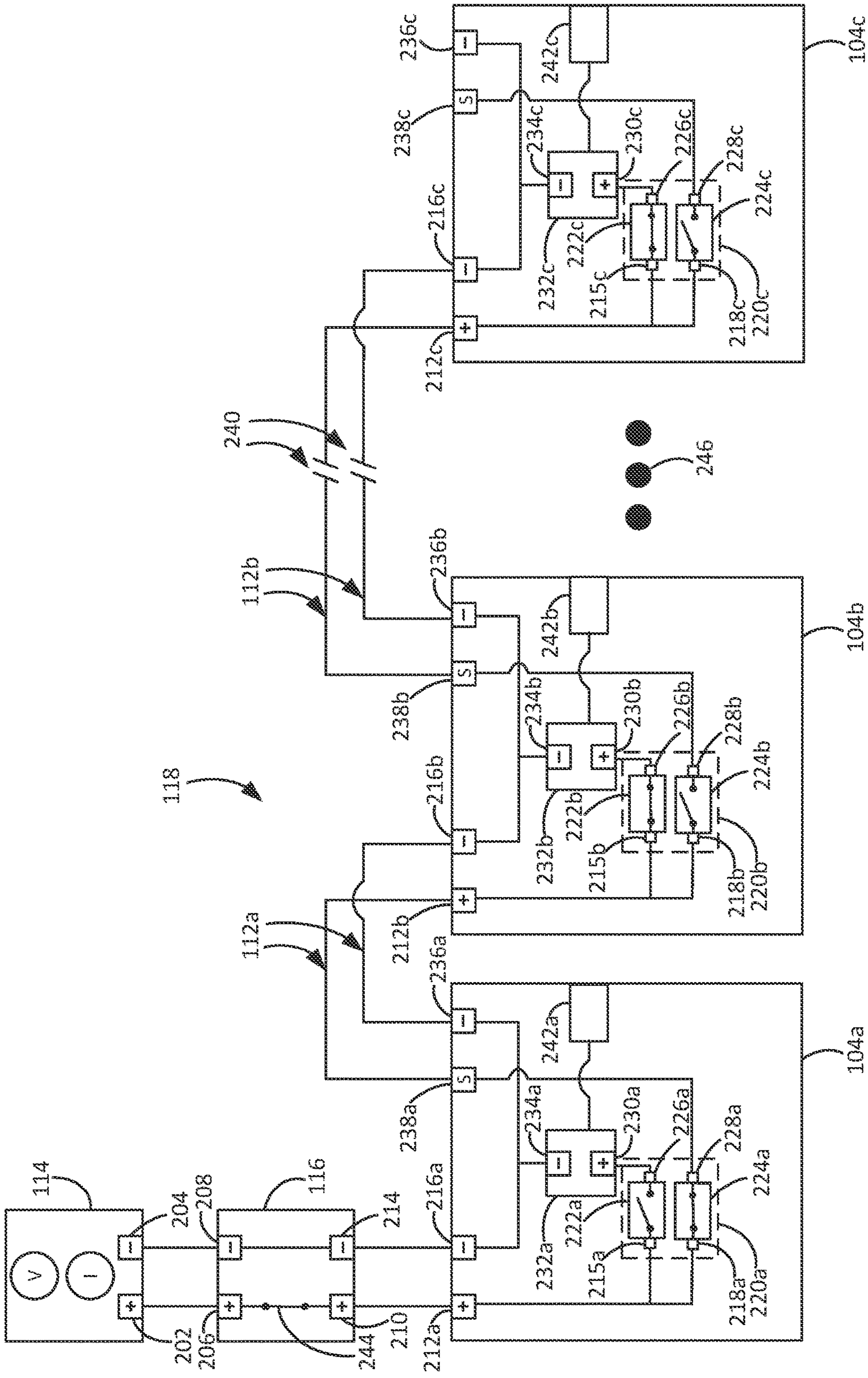
FIG. 3 is another diagram of an exemplary IT environment.

FIGS. 2 and 3 are diagrams of an exemplary IT environment 118. In IT environment 118, power supply 114 includes a positive power supply ("PS") terminal 202 and a negative-PS terminal 204. Positive-PS terminal 202 may be connected to a positive-input terminal 206 on controller 116. Negative-PS terminal 204 may be connected to a negative-input terminal 208 on controller 116. A positive-output terminal 210 on controller 116 may be connected to a positive-input terminal 212*a* on lock 104*a*. A negative-output terminal 214 on controller 116 may be connected to a negative-input terminal 216*a* on lock 104*a*. At least one of positive-input terminal 212*a* or negative-input terminal 216*a* may be an input.

Positive-input terminal 212*a* may be coupled to a first normally-closed ("NC") input terminal 215*a* of a microswitch 220*a* and to a first normally-open ("NO") input terminal 218*a* of microswitch 220*a*. In some embodiments, first NC-input terminal 215*a* and first NO-input terminal 218*a* may be a common terminal on microswitch 220*a*. In some embodiments, first NC-input terminal 215*a* may be on a standalone NC switch 222*a*, and first NO-input terminal 218*a* may be on a standalone NO switch 224*a*. In some embodiments, NC switch 222*a* and NO switch 224*a* may be part of microswitch 220*a*. In some embodiments, NC switch 222*a* and NO switch 224*a* may be standalone switches. Microswitch 220*a* may include an NC-output terminal 226*a*. Microswitch 220*a* may include an NO-output terminal 228*a*. In some embodiments, NC-output terminal 226*a* may be part of standalone NC switch 222*a*, and NO-output terminal 228*a* may be part of standalone NO switch 224*a*. NC-output terminal 226*a* may be coupled to a positive-electromagnet terminal 230*a* of an electromagnet 232*a*. A negative-electromagnet terminal 234*a* of electromagnet 232*a* may be coupled to negative-input terminal 216*a*. In some embodiments, negative-electromagnet terminal 234*a* may be coupled to a negative-output terminal 236*a* instead or in addition to being coupled to negative-input terminal 216*a*. Electromagnet 232*a* may be coupled mechanically, electrically, or otherwise to a latch 242*a* in lock 104*a*. NO-output terminal 228*a* may be coupled to supply-output terminal 238*a*. Supply-output terminal 238*a* may be coupled to positive-input terminal 212*b* on lock 104*b*. In some embodiments, negative-output terminal 236*a* may be coupled to a negative-input terminal 216*b* on lock 104*b*. At least one of positive-input terminal 212*b* or negative-input terminal 216*b* may be an input. At least one of supply-output terminal 238*a* or negative-output terminal 236*a* may be an output.

Positive-input terminal 212*b* may be coupled to a first NC-input terminal 215*b* of a microswitch 220*b* and to a first NO-input terminal 218*b* of microswitch 220*b*. In some embodiments, first NC-input terminal 215*b* and first NO-input terminal 218*b* may be a common terminal on microswitch 220*b*. In some embodiments, first NC-input terminal 215*b* may be on a standalone NC switch 222*b*, and first NO-input terminal 218*b* may be on a standalone NO switch 224*b*. In some embodiments, NC switch 222*b* and NO switch 224*b* may be part of microswitch 220*b*. In some embodiments, NC switch 222*b* and NO switch 224*b* may be standalone switches. Microswitch 220*b* may include an NC-output terminal 226*b*. Microswitch 220*b* may include an NO-output terminal 228*b*. In some embodiments, NC-output terminal 226*b* may be part of standalone NC switch 222*b*, and NO-output terminal 228*b* may be part of standalone NO switch 224*b*. NC-output terminal 226*b* may be coupled to a positive-electromagnet terminal 230*b* of an electromagnet 232*b*. A negative-electromagnet terminal 234*b* of electromagnet 232*b* may be coupled to negative-input terminal 216*b*. In some embodiments, negative-electromagnet terminal 234*b* may be coupled to a negative-output terminal 236*b* instead or in addition to being coupled to negative-input terminal 216*b*. Electromagnet 232*b* may be coupled mechanically, electrically, or otherwise to a latch 242*b* in lock 104*b*. NO-output terminal 228*b* may be coupled to supply-output terminal 238*b*. Supply-output terminal 238*b* may be coupled to positive-input terminal 212*c* on lock 104*c*. In some embodiments, negative-output terminal 236*b* may be coupled to a negative-input terminal 216*c* on lock 104*c*. At least one of positive-input terminal 212*c* or negative-input terminal 216*c* may be an input. At least one of supply-output terminal 238*b* or negative-output terminal 236*b* may be an output.

Positive-input terminal 212*c* may be coupled to a first NC-input terminal 215*c* of a microswitch 220*c* and to a first NO-input terminal 218*c* of microswitch 220*c*. In some embodiments, first NC-input terminal 215*c* and first NO-input terminal 218*c* may be a common terminal on microswitch 220*c*. In some embodiments, first NC-input terminal 215*c* may be on a standalone NC switch 222*c*, and first NO-input terminal 218*c* may be on a standalone NO switch 224*c*. In some embodiments, NC switch 222*c* and NO switch 224*c* may be part of microswitch 220*c*. Microswitch 220*c* may include an NC-output terminal 226*c*. Microswitch 220*c* may include an NO-output terminal 228*c*. In some embodiments, NC-output terminal 226*c* may be part of standalone NC switch 222*c*, and NO-output terminal 228*c* may be part of standalone NO switch 224*c*. In some embodiments, NC switch 222*c* and NO switch 224*c* may be standalone switches. NC-output terminal 226*c* may be coupled to a positive-electromagnet terminal 230*c* of an electromagnet 232*c*. A negative-electromagnet terminal 234*c* of electromagnet 232*c* may be coupled to negative-input terminal 216*c*. In some embodiments, negative-electromagnet terminal 234*c* may be coupled to a negative-output terminal 236*c* instead or in addition to being coupled to negative-input terminal 216*c*. Electromagnet 232*c* may be coupled mechanically, electrically, or otherwise to a latch 242*c* in lock 104*c*. NO-output terminal 228*c* may be coupled to supply-output terminal 238*c*. At least one of supply-output terminal 238*c* or negative-output terminal 236*c* may be an output.

It is to be understood that additional locks may be coupled between lock 104*b* and 104*c*, as indicated by line breaks 240 in cables 112*b* and ellipsis 246. Such additional locks may be connected to other locks similar to the manner in which lock 104*b* is connected to lock 104*a* and lock 104*c*. Such additional locks may have internal connections similar to lock 104*b*.

In some embodiments, controller 116 may receive an instruction to unlock at least lock 104*a* and lock 104*b*. This may cause controller 116 to transmit power from power supply 114 to lock 104*a*. Controller 116 may transmit this power by closing a switch 244. Switch 244 may be a mechanical switch, such as one or more relays, or a solid-state switch, such as one or more transistors. Switch 244 may be coupled between positive-PS terminal 202 and positive-input terminal 206. When switch 244 closes, power may be transmitted from power supply 114 to electromagnet 232*a* over NC switch 222*a*. When this happens, a voltage may be applied across electromagnet 232*a* because negative-electromagnet terminal 234*a* may be tied to a voltage different from the voltage established at positive-electromagnet terminal 230*a*. When a voltage is established across electromagnet 232*a*, electromagnet may cause a force to be applied onto microswitch 220*a* such that NC switch 222*a* opens and NO switch 224*a* closes. Instead or in addition, when a voltage is established across electromagnet 232*a*, electromagnet 232*a* may cause a force to be applied onto latch 242*a* in lock 104*a*. In some embodiments, electromagnet 232*a* may cause a force to be applied onto a standalone NC switch 222*a* such that it opens and onto a standalone NO switch 224*a* such that it closes. Before NC switch 222*a* opens, a current may flow from power supply 114 through electromagnet 232*a*. FIG. 3 is another diagram of exemplary IT environment 118. When NC switch 222*a* opens and NO switch 224*a* closes, the voltage will be disconnected from electromagnet 232*a* and current will cease flowing through electromagnet 232*a*, current will cease flowing through electromagnet 232*a*, and power will be transmitted from power supply 114 to electromagnet 232*b* in lock 104*b* via NO switch 224*a*, supply-output terminal 238*a*, positive-input terminal 212*b*, and NC switch 222*b*. In this manner, lock 104*b* receives a voltage from upstream lock 104*a* via the input of lock 104*b* in response to the voltage being applied across electromagnet 232*a*.

When power is transmitted from power supply 114 to electromagnet 232*b*, a voltage may be applied across electromagnet 232*b* because negative-electromagnet terminal 234*b* may be tied to a voltage different from the voltage established at positive-electromagnet terminal 230*b*. The voltage applied across electromagnet 232*b* may be the same as the voltage applied across electromagnet 232*a*, within about 5% of the voltage applied across electromagnet 232*a*, within about 10% of the voltage applied across electromagnet 232*a*, or within about 20% of the voltage applied across electromagnet 232*a*. When a voltage is established across electromagnet 232*b*, electromagnet may cause a force to be applied onto microswitch 220*b* such that NC switch 222*b* opens and NO switch 224*b* closes. Instead or in addition, when a voltage is established across electromagnet 232*b*, electromagnet 232*b* may cause a force to be applied onto latch 242*b* in lock 104*b*. In some embodiments, electromagnet 232*b* may cause a force to be applied onto a standalone NC switch 222*b* such that it opens and onto a standalone NO switch 224*b* such that it closes. Before NC switch 222*b* opens, a current may flow from power supply 114 through electromagnet 232*b*. When NC switch 222*b* opens and NO switch 224*b* closes, the voltage will be disconnected from electromagnet 232*b* and current will cease flowing through electromagnet 232*b*, and power will be transmitted from power supply 114 to electromagnet 232*c* in lock 104*c* via NO switch 224*b*, supply-output terminal 238*b*, positive-input terminal 212*c*, and NC switch 222*c*.

When power is transmitted from power supply 114 to electromagnet 232*c*, a voltage may be applied across electromagnet 232*c* because negative-electromagnet terminal 234*c* may be tied to a voltage different from the voltage established at positive-electromagnet terminal 230*c*. The voltage applied across electromagnet 232*c* may be the same as the voltage applied across electromagnet 232*b*, within about 5% of the voltage applied across electromagnet 232*b*, within about 10% of the voltage applied across electromagnet 232*b*, or within about 20% of the voltage applied across electromagnet 232*b*. When a voltage is established across electromagnet 232*c*, electromagnet may cause a force to be applied onto microswitch 220*c* such that NC switch 222*c* opens and NO switch 224*c* closes. Instead or in addition, when a voltage is established across electromagnet 232*c*, electromagnet 232*c* may cause a force to be applied onto latch 242*c* in lock 104*c*. In some embodiments, electromagnet 232*c* may cause a force to be applied onto a standalone NC switch 222*c* such that it opens and onto a standalone NO switch 224*c* such that it closes. Before NC switch 222*c* opens, a current may flow from power supply 114 through electromagnet 232*c*. When NC switch 222*c* opens and NO switch 224*c* closes, the voltage will be disconnected from electromagnet 232*c* and current will cease flowing through electromagnet 232*c*.

In the foregoing manner, locks in IT environment 118 may sequentially draw current from power supply 114 and may be unlocked sequentially.

In some embodiments, switch 244 may be coupled between negative-PS terminal 204 and negative-input terminal 208. In some embodiments, switch 244 may be external to controller 116, such as between positive-output terminal 210 and positive-input terminal 212*a* or between negative-output terminal 214 and negative-input terminal 216*a*. In some embodiments, polarities of terminals can be interchanged such that the zero-volt reference or a negative voltage is transmitted through switches and the positive voltage is coupled at a common electrical node across locks in IT environment 118. In this or other embodiments, switch 244 may be between negative-input terminal 208 and negative-output terminal 214 on controller 116 or between negative-output terminal 214 and negative-input terminal 216*a*.

In some embodiments, one or more terminals in lock 104*a*, lock 104*b*, and lock 104*c*, such as positive-input terminal 212*a* and negative-output terminal 236*a*, may be one or more openings in a lock chassis, such as a chassis of lock 104*a*. Wires or cables may be passed through such openings.

Figure 4:
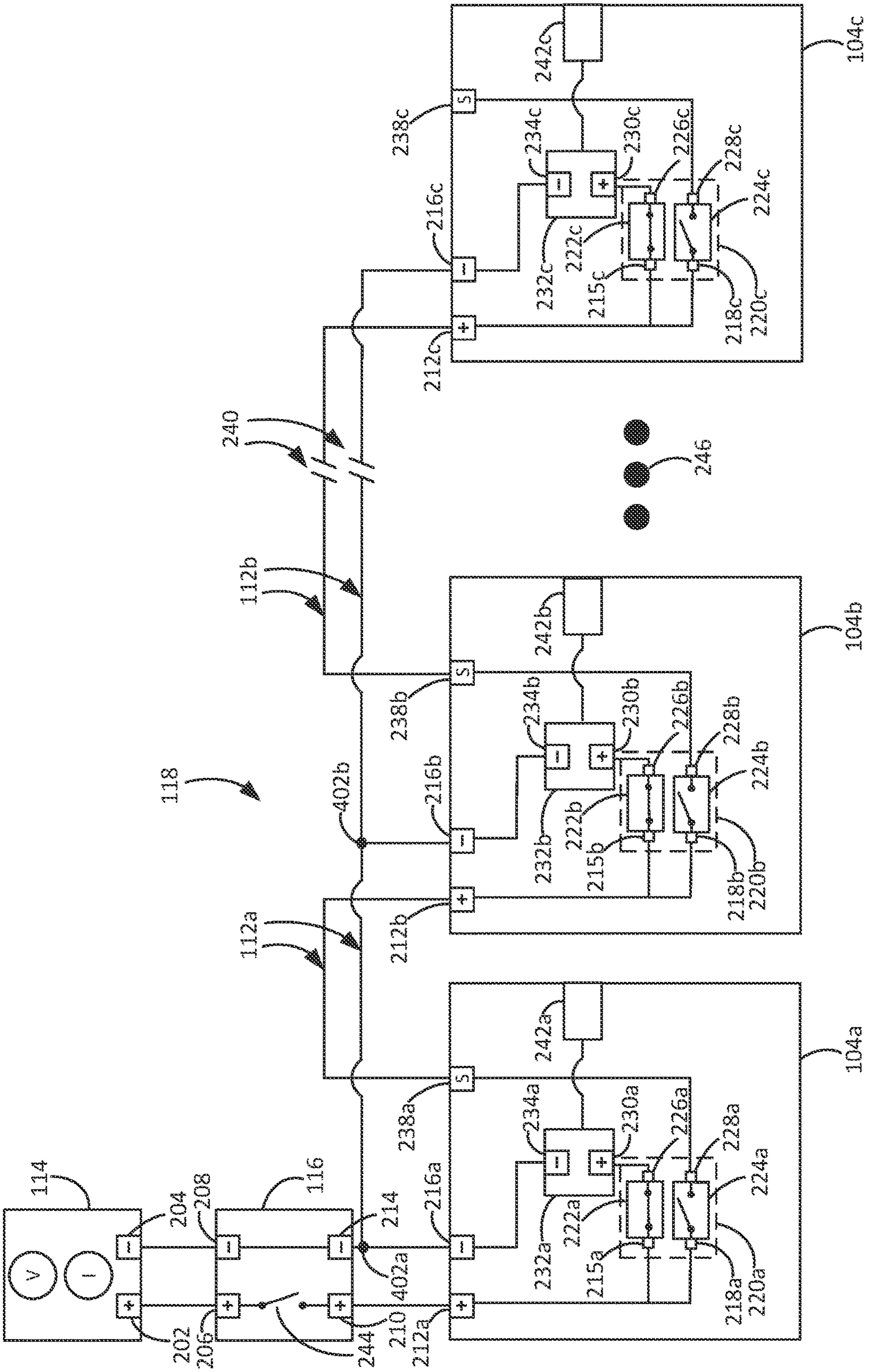
FIG. 4 is another diagram of an exemplary IT environment.

FIG. 4 is another diagram of exemplary IT environment 118. In some embodiments, at least one of lock 104*a*, lock 104*b*, or lock 104*c* may respectively lack negative-output terminal 236*a*, negative-output terminal 236*b*, and negative-output terminal 236*c*. In this and other cases, at least two of negative-input terminals 216*a*, negative-input terminals 216*b*, or negative-input terminals 216*c* may be coupled at points external to at least one of lock 104*a*, lock 104*b*, or lock 104*c*, such as at points 402*a*, 402*b*.

Figure 5:
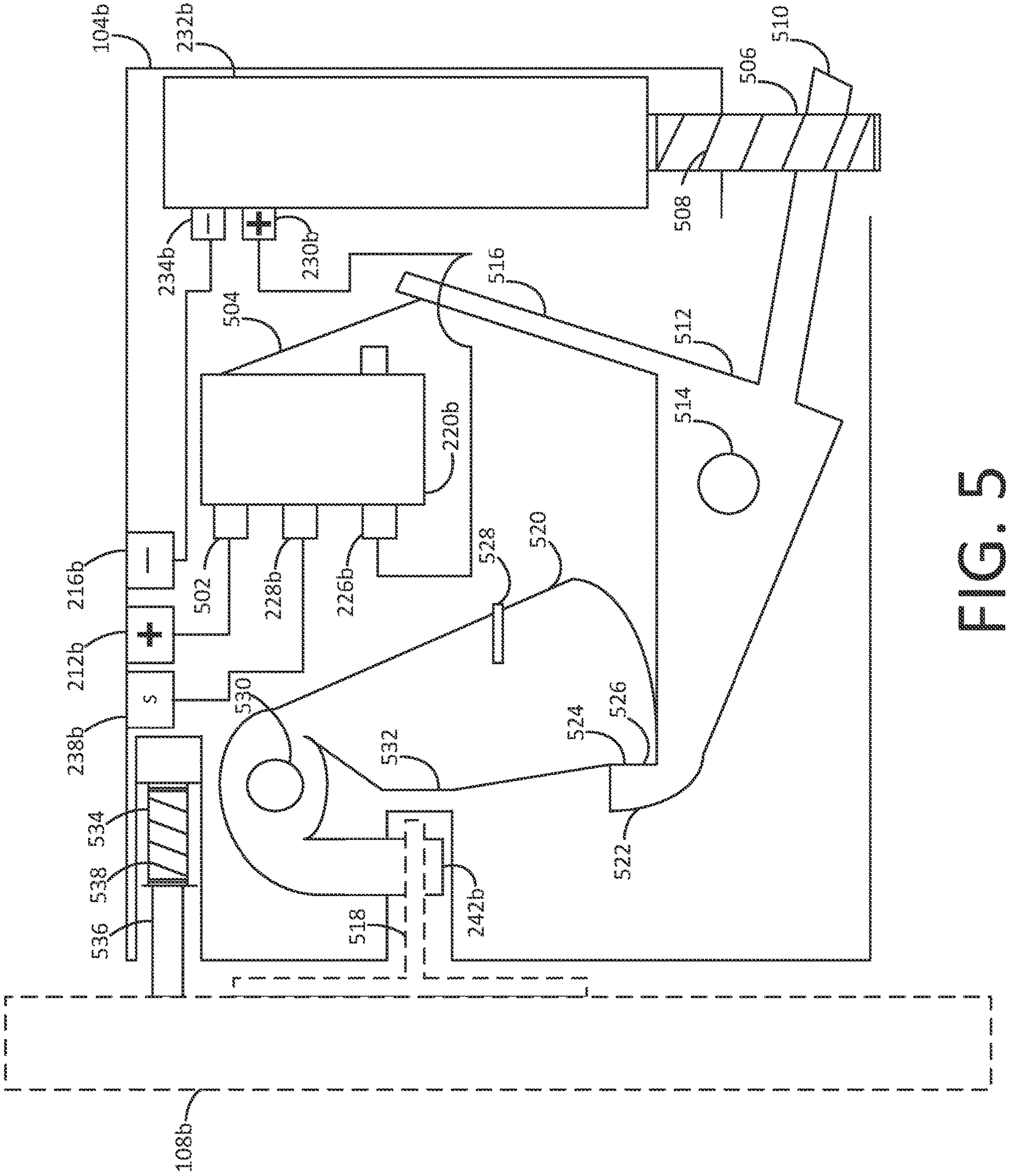
FIG. 5 is a diagram of an exemplary lock.
Figure 6:
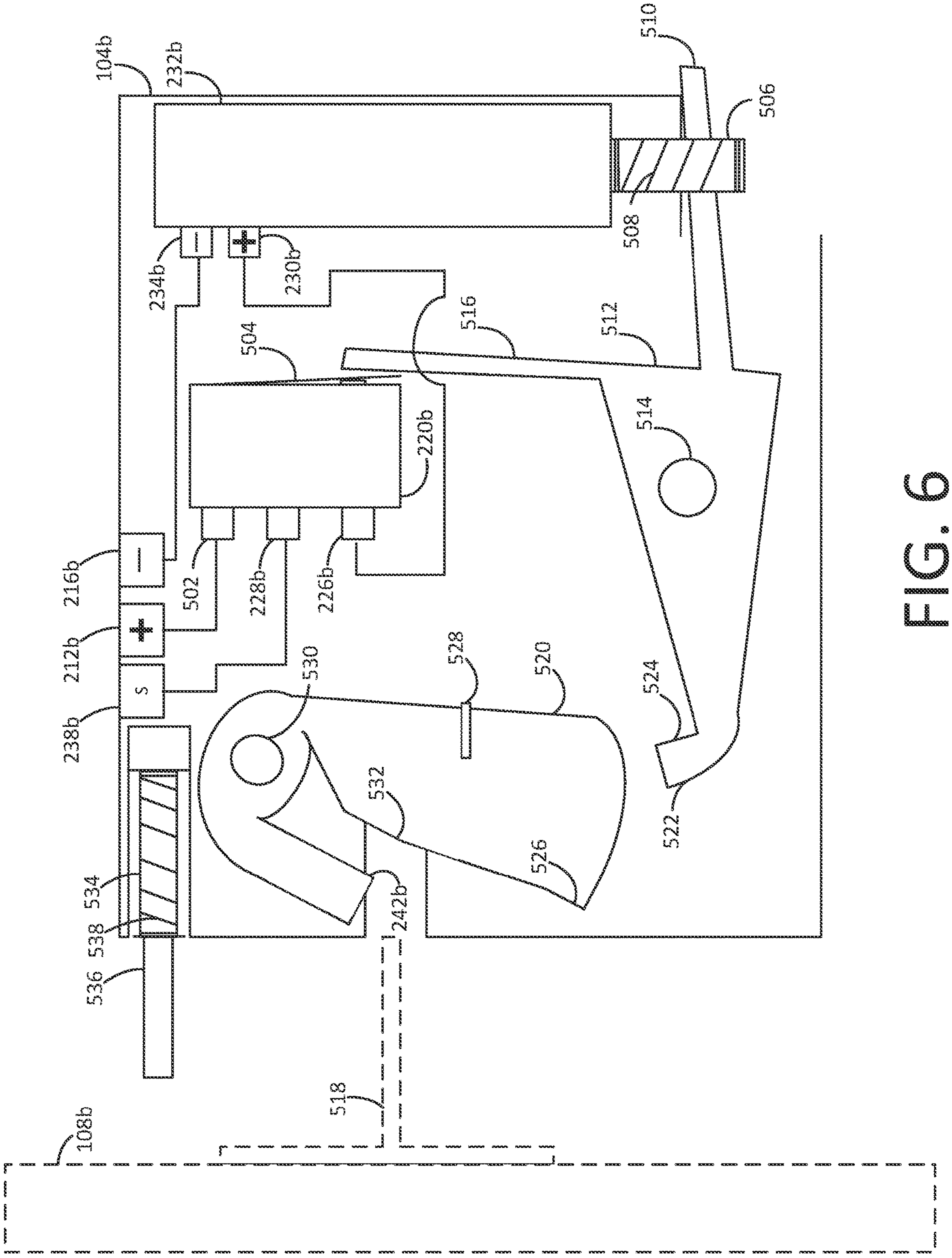
FIG. 6 is another diagram of an exemplary lock.
Figure 7:
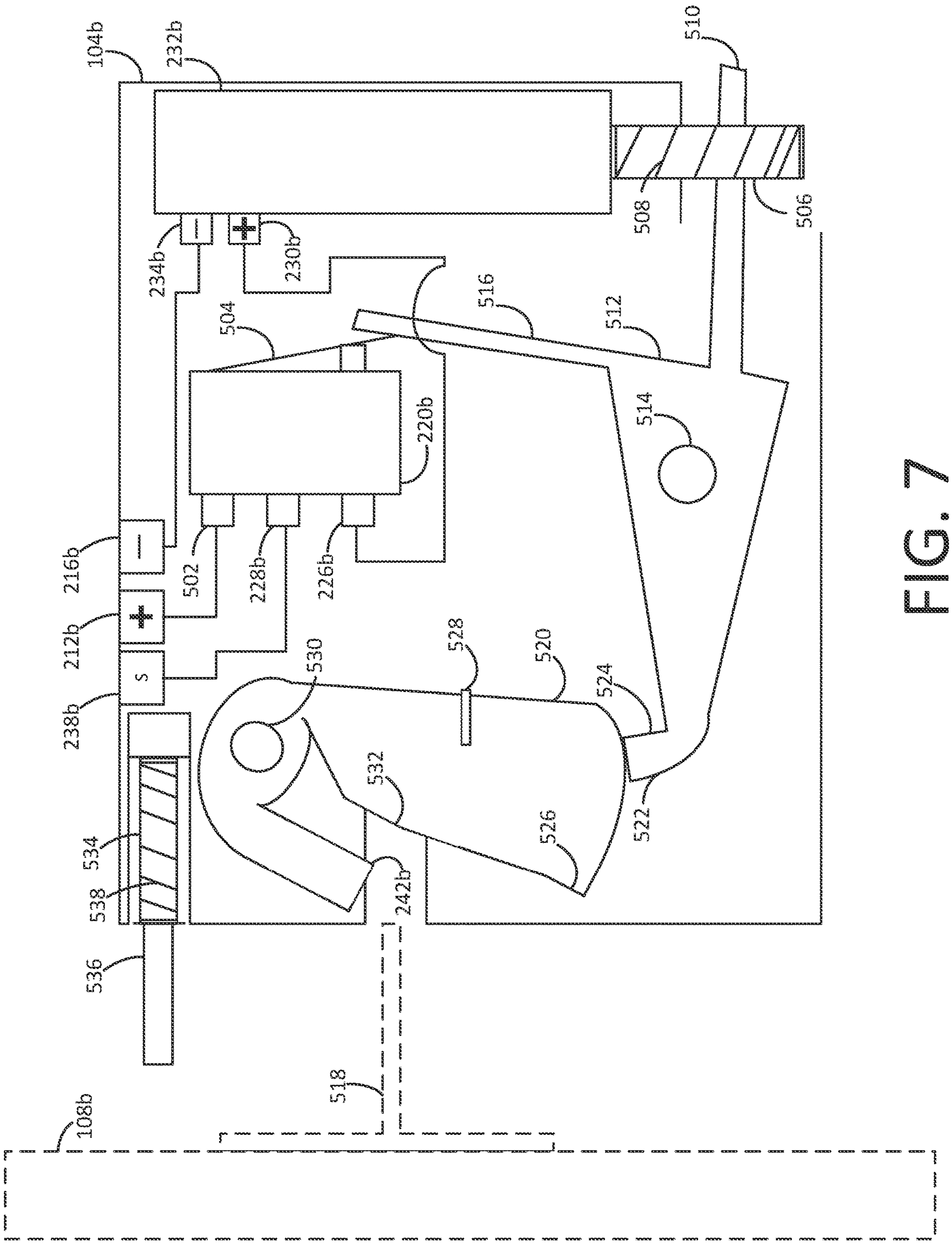
FIG. 7 is another diagram of an exemplary lock.

FIGS. 5-7 are diagrams of an exemplary lock 104*b*. Lock 104*b* may be similar or identical to at least one of lock 104*a* or lock 104*c*. FIG. 5 is a diagram of lock 104*b* in a locked state. Lock 104*b* may include positive-input terminal 212*b*, negative-input terminal 216*b*, and supply-output terminal 238*b*. In some embodiments, lock 104*b* may include negative-output terminal 236*b*, which may be coupled to negative-electromagnet terminal 234*b*. Lock 104*b* may include a common terminal 502. Common terminal 502 may be a combination of first NC-input terminal 215*b* and first NO-input terminal 218*b* on microswitch 220*b*.

FIG. 6 is a diagram of lock 104*b* in an unlocked state. When power is transmitted from power supply 114 to electromagnet 232*b*, a voltage may be applied across electromagnet 232*b*. When a voltage is established across electromagnet 232*b*, electromagnet may cause a force to be applied onto a microswitch lever 504 of microswitch 220*b* such that NC switch 222*b* opens and NO switch 224*b* closes. For example, electromagnet 232*b* may include a plunger 506 that is initially held in an outward position from electromagnet 232*b* by a first spring 508, as shown in FIG. 5. When a voltage is established across electromagnet 232*b*, a magnetic force may cause plunger 506 to move inward to electromagnet 232*b*, as shown in FIG. 6. Plunger 506 may be mechanically coupled to a first hook lever 510 of first hook 512. When plunger 506 moves inward to electromagnet 232*b*, plunger 506 may apply a force onto first hook lever 510 such that first hook 512 rotates about a pivot 514. During this rotation, a second hook lever 516 of first hook 512 may apply of force onto microswitch lever 504. It is to be understood that other combinations and arrangements of components for transferring a force from electromagnet 232*b* to microswitch 220*b* or otherwise changing the state of microswitch 220*b* are envisioned. In this manner, lock 104*b* may be configured to disconnect the voltage from electromagnet 232*b* in response to NC switch 222*b* opening.

When a voltage is established across electromagnet 232*b*, electromagnet 232*b* may cause a force to be applied onto a latch 242*b* of second hook 520 such that latch 242*b* clears an eye 518 of door 108*b*. When latch 242*b* clears eye 518, door 108*b* may be opened. In this regard, lock 104*b* may be unlocked when latch 242*b* clears eye 518. When a voltage is established across electromagnet 232*b*, a magnetic force may cause plunger 506 to move inward to electromagnet 232*b*. When plunger 506 moves inward to electromagnet 232*b*, plunger 506 may apply a force onto first hook lever 510 such that first hook 512 rotates about pivot 514. Before first hook 512 rotates about pivot 514, second hook 520 may be held in a first position where latch 242*b* occupies eye 518, as shown in FIG. 5. In this regard, lock 104*b* may be locked when latch 242*b* occupies eye 518. Second hook 520 may be held in the first position by angled portion 522 of first hook 512 such that surface 524 of angled portion 522 presses against surface 526 of second hook 520 under tension from second spring 528. When plunger 506 moves inward to electromagnet 232*b*, angled portion 522 may rotate about pivot 514. When angled portion 522 rotates about pivot 514, second spring 528 may apply a force onto second hook 520 such that latch 242*b* rotates about pivot 530. When latch 242*b* rotates about pivot 530, latch 242*b* may clear eye 518, as shown in FIG. 6. Accordingly, electromagnet 232*b* is configured to open latch 242*b* in response to a voltage being applied across electromagnet 232*b* by applying a force onto at least one of first hook 512 or second hook 520. It is to be understood that other combinations and arrangements of components for transferring a force from electromagnet 232*b* to latch 242*b* or otherwise changing the lock-state of lock 104*b* are envisioned.

In some embodiments, a pushing surface 532 of second hook 520 may apply a force on eye 518 when second hook 520 rotates about pivot 530. In this manner, lock 104*b* may push door 108*b* open when lock 104*b* is unlocked. Instead or in addition, an auxiliary-spring actuator 534 may apply a force on door 108*b* such that lock 104*b* pushes door 108*b* open when lock 104*b* is unlocked. For example, auxiliary-spring actuator 534 may include a plunger 536 that is pushed outward from auxiliary-spring actuator 534 by a third spring 538. Door 108*b* may press on plunger 536 and compress third spring 538 when held in a closed position by latch 242*b*, as shown in FIG. 5. When latch 242*b* clears eye 518, third spring 538 may apply a force onto plunger 536, which may in turn push door 108*b* open. It is to be understood that other combinations and arrangements of components for transferring a force from electromagnet 232*b* to door 108*b* or otherwise opening door 108*b* are envisioned.

FIG. 7 is a diagram of lock 104*b* in an unlocked state when no magnetic force is applied on plunger 506. Lock 104*b* may be set into a locked state by pressing eye 518 against pushing surface 532, causing second hook 520 to rotate about pivot 530 and revert lock 104*b* to a state shown in FIG. 5.

Embodiments of the present disclosure may comprise a special purpose computer including a variety of computer hardware, as described in greater detail below.

Embodiments within the scope of the present disclosure may also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer-readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein may employ a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

When introducing elements of aspects of the disclosure or the embodiments thereof, the articles “a”, “an”, “the” and “said” are intended to mean that there are one or more of the elements. The terms “comprising”, “including”, and “having” are intended to be inclusive and mean that there may be additional elements other than the listed elements. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A lock, comprising:

a latch;

an electromagnet configured to open the latch in response to a first voltage being applied across the electromagnet;

a normally closed switch configured to be opened by a first magnetic force in response to the first voltage being applied across the electromagnet; and a normally open switch configured to be closed by a second magnetic force in response to the first voltage being applied across the electromagnet.

2. The lock of claim 1, further comprising an input.

3. The lock of claim 2, wherein the lock is configured to receive the first voltage from an upstream lock via the input in response to the first voltage being applied across an electromagnet in the upstream lock.

4. The lock of claim 1, further comprising an output.

5. The lock of claim 4, wherein the lock is configured to output a second voltage to a downstream lock via the output in response to the first voltage being applied across the electromagnet.

6. The lock of claim 5, wherein the lock is configured to apply the second voltage to the output in response to the normally open switch closing.

7. The lock of claim 5, wherein the first voltage is within about 20% of the second voltage.

8. The lock of claim 1, further comprising a microswitch comprising the normally closed switch and the normally open switch.

9. The lock of claim 1, wherein the lock is configured to disconnect the first voltage from the electromagnet in response to the normally closed switch opening.

10. The lock of claim 1, wherein the electromagnet is configured to open the latch in response to the first voltage is applied across the electromagnet by applying a force onto a first hook configured to open the latch.

11. The lock of claim 10, wherein the first hook is configured to engage at least one switch in response to the first voltage being applied across the electromagnet.

12. The lock of claim 11, wherein the first hook is further configured to permit rotation of a second hook under tension from a spring in response to the first voltage being applied across the electromagnet, wherein the second hook comprises the latch.

13. A method of opening a lock, comprising:

applying a first voltage across an electromagnet in a lock, wherein the electromagnet is configured to open a latch in the lock in response to the first voltage being applied across the electromagnet;

causing the electromagnet to open the latch in response to the first voltage being applied across the electromagnet;

opening a normally closed switch by a first magnetic force caused by applying the first voltage across the electromagnet; and closing a normally open switch by a second magnetic force caused by applying the first voltage across the electromagnet.

14. The method of claim 13, wherein the lock comprises an input and the first voltage is an input voltage applied to the input.

15. The method of claim 13, wherein applying the first voltage across the electromagnet comprises applying the first voltage across the electromagnet via the input by applying the first voltage across an electromagnet in an upstream lock.

16. The method of claim 13, further comprising applying a second voltage to a downstream lock via a lock output by applying the first voltage across the electromagnet.

17. The method of claim 16, wherein applying the second voltage to the downstream lock via the lock output comprises closing the normally open switch.

18. The method of claim 16, wherein the first voltage is within about 20% of the second voltage.

19. The method of claim 13, further comprising disconnecting the first voltage from the electromagnet by opening the normally closed switch.

20. The method of claim 13, wherein the normally closed switch is in the lock and the normally open switch is in the lock.

21. A method of assembling a lock, comprising:

coupling a latch to an electromagnet configured to open the latch in response to a first voltage being applied across the electromagnet;

coupling to the electromagnet a normally closed switch configured to be opened by a first magnetic force in response to the first voltage being applied across the electromagnet; and coupling to the electromagnet a normally open switch configured to be closed by a second magnetic force in response to the first voltage being applied across the electromagnet.

* * * * *